United States Patent [19]

Meiwes et al.

[11] Patent Number: 5,467,749
[45] Date of Patent: Nov. 21, 1995

[54] APPARATUS FOR GOVERNING THE IDLING RPM OF AN INTERNAL COMBUSTION ENGINE

[75] Inventors: Johannes Meiwes, Markgroningen; Albert Gerhard, Tamm; Uwe Hammer, Schwieberdingen, all of Germany

[73] Assignee: Robert Bosch GmbH, Stuttgart, Germany

[21] Appl. No.: 235,054

[22] Filed: Apr. 29, 1994

[30] Foreign Application Priority Data

May 8, 1993 [DE] Germany ............... 43 15 436.0

[51] Int. Cl.$^6$ ............... F02D 9/02; F02D 33/00
[52] U.S. Cl. ............... 123/339.27
[58] Field of Search ............... 123/339, 531, 123/533, 585; 251/129.15

[56] References Cited

U.S. PATENT DOCUMENTS

| | | | |
|---|---|---|---|
| 1,850,457 | 3/1932 | Hughes. | |
| 4,771,750 | 9/1988 | Breitkreutz et al. | 123/339 |
| 4,873,955 | 10/1989 | McAuliffe, Jr. | 123/339 |
| 4,986,236 | 1/1991 | Kobayashi | 123/339 |
| 5,070,838 | 12/1991 | McKay | 123/339 |
| 5,090,381 | 2/1992 | Tanabe | 123/339 |
| 5,325,830 | 7/1994 | Hammer | 123/339 |
| 5,406,919 | 4/1995 | Ikuta et al. | 123/339 |

FOREIGN PATENT DOCUMENTS

| | | |
|---|---|---|
| 1953096 | 4/1971 | Germany. |
| 1229162 | 4/1971 | United Kingdom. |
| 1384519 | 2/1975 | United Kingdom. |

OTHER PUBLICATIONS

"Development of Air–Assisted Injector System" by Kenichi Harada et al. Feb. 24–28, 1992, SAE, pp. 55–62.

*Primary Examiner*—Willis R. Wolfe
*Attorney, Agent, or Firm*—Edwin E. Griegg; Ronald E. Greigg

[57] ABSTRACT

An apparatus for governing the idling rpm of an internal combustion engine, in order to control a quantity of operating fluid to be delivered to at least two flow lines of the engine. According to the invention, the first valve closing member and the second valve closing member are disposed axially displaceably relative to one another and coupled via a slaving device in such a way that in the closing position of the first valve closing member, the second valve closing member is likewise closed, and the second valve closing member is adjustable in the valve opening direction only after attainment of a predetermined opening position of the first valve closing member. The closing properties of the apparatus can be adapted as required by means of the selection of the disposition and design of the springs that act upon the valve closing members. The apparatus is especially suitable for governing the idling rpm of a mixture-compressing internal combustion engine with externally supplied ignition, by controlling a quantity of operating fluid that is deliverable to the engine via a fuel metering device and an intake conduit.

8 Claims, 2 Drawing Sheets

APPARATUS FOR GOVERNING THE IDLING RPM OF AN INTERNAL COMBUSTION ENGINE

BACKGROUND OF THE INVENTION

The invention is based on an apparatus for governing the idling rpm of an internal combustion engine as defined hereinafter. Such an apparatus is already known (Development of air-assisted injector system, SAE [Society of Automotive Engineers], Technical Paper Series 920294, pp. 57/58, 1992), in which a first valve closing member controls a first valve opening cross section to a first flow line and a second valve closing member controls a second valve opening cross section to a second flow line. The first flow line communicates with a fuel metering device of the engine and serves to deliver an operating fluid, in particular the aspirated air, to the fuel metering device for the sake of air-assisted fuel injection. The second flow line communicates directly with an intake conduit of the engine downstream of a throttle valve disposed in the intake conduit. Via the second flow line, operating fluid can be delivered to the intake conduit and from there also to the engine. The first and second valve closing members are actuatable by means of an adjusting member and are disposed on the adjusting member with a fixed axial spacing from one another. It is disadvantageous in such an apparatus that when the adjusting member executes an adjusting motion, both valve closing members are moved simultaneously in the direction of their opening position, so that for instance whenever only one opening of the first valve opening cross section to the first flow line is desired, for instance, then an undesired leakage flow takes place via the second valve opening cross section to the second flow line as well.

OBJECT AND SUMMARY OF THE INVENTION

The apparatus according to the invention for governing the idling rpm of an internal combustion engine has the advantage over the prior art that governing the idling rpm can be done to lower rpm than previously possible, and particularly at low rpm can be done substantially more sensitively and accurately, since upon an adjusting motion of the adjusting member from a closing position of the valve closing members, only the first valve closing member is initially adjustable in the direction of its opening position. The second valve closing member initially continues to close the second valve opening cross section to the second flow line, so that an undesired leakage flow via the second valve opening cross section when the first valve opening cross section opens is avoided. Not until a predetermined opening position of the first valve closing member is reached is the second valve closing member adjustable in the direction of its opening position and hence is the second valve opening cross section openable. This has the advantage that a quantity of operating fluid to be delivered to the engine in order to govern the idling rpm is initially carried to the fuel metering device via the first flow line, and only if there is a greater requirement for operating fluid, which cannot be covered solely via the first flow line, for instance as a result of throttling action in the first flow line, is operating fluid deliverable to the engine via the second flow line.

Advantageous further features of and improvements to the apparatus according to the invention can be attained with the characteristics recited herein. If the first and second valve closing member are embodied as conical valve closing members, with associated conical seat faces, good sealing action of the apparatus according to the invention can be attained. Because of the radial mobility of the second valve closing member and the disposition of an elastic diaphragm between the adjusting member and the second valve closing member, an undesired leakage flow to the second flow line can be reduced still further. By means of a different disposition of these springs acting upon the valve closing members, the closing properties of the apparatus according to the invention can be adapted to given requirements. For instance, if the second spring has greater initial tension than the first, and if the second spring is disposed between the second valve closing member and the adjusting member, then an emergency air function of the apparatus can be achieved, using a bidirectional actuator.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
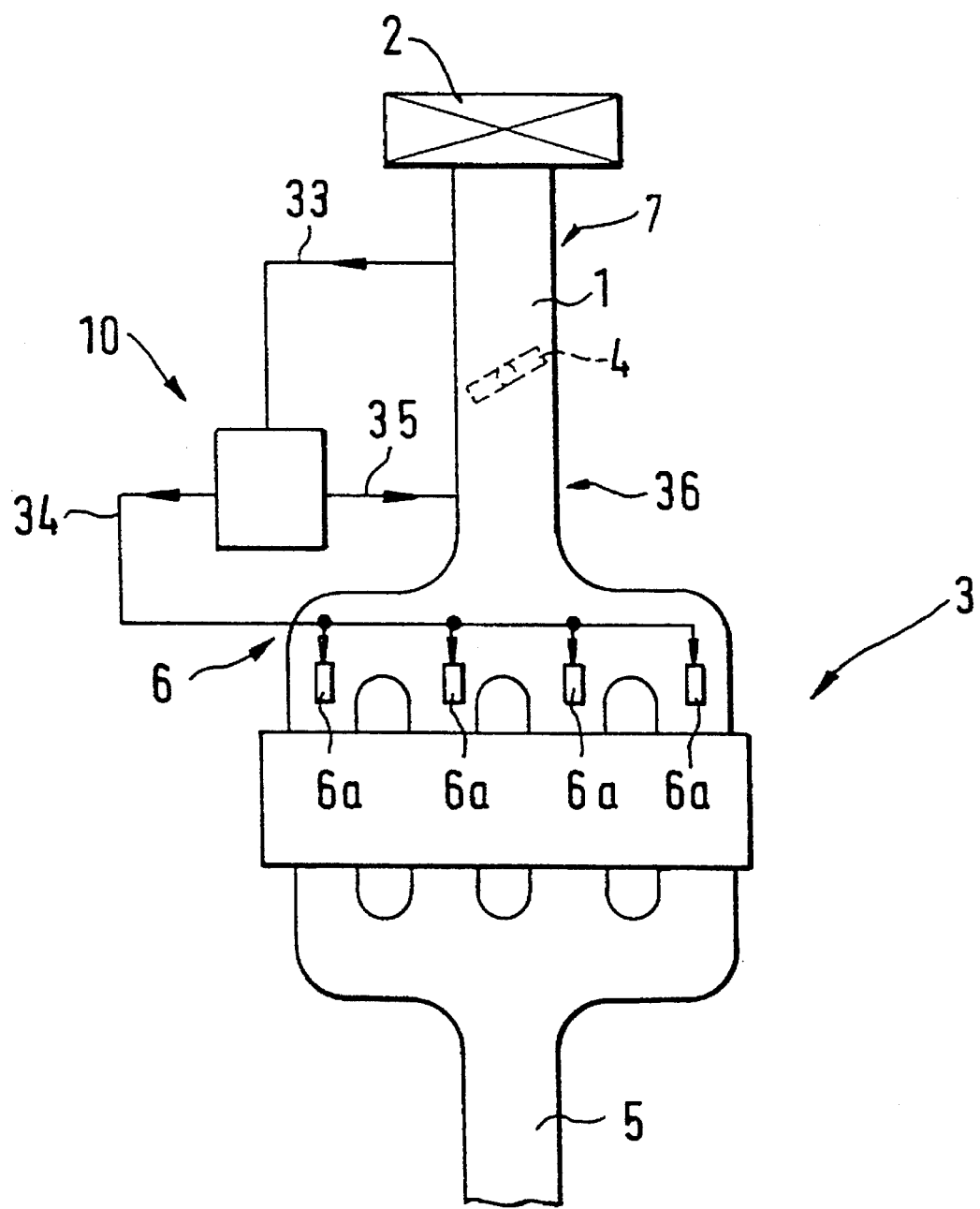
FIG. 1 is a schematic illustration of the disposition of an apparatus for governing the idling rpm of an internal combustion engine.

FIG. 1 shows an intake conduit 1, in which an operating fluid, in particular aspirated air, can flow from an operating fluid filter 2 to a mixture-compressing internal combustion engine 3 with externally supplied ignition. The flow cross section of the intake conduit 1 is controllable via a throttle valve 4, acting as a throttle device, so that depending on the rotary position of the throttle valve 4 in the intake conduit 1, more or less operating fluid reaches the engine 3. In an exhaust gas tube 5, the exhaust gases produced during operation of the engine 3 are collected and removed.

The throttle valve 4 is bridged parallel by an apparatus 10 according to the invention for governing the idling rpm of the engine 3, by means of which apparatus, in particular, a quantity of operating fluid to be delivered to the engine 3 during idling of the engine 3 (that is, with the throttle valve 4 closed), is controllable. The apparatus 10 is connected to a region 7 of the intake conduit 1, located upstream of the throttle valve 4, by way of example, via an operating fluid delivery line 33. The apparatus 10 also communicates via a first flow line 34 with a fuel metering device 6, for instance with fuel injection valves 6a, and via a second flow line 35 with a region 36 of the intake conduit 1 downstream of the throttle valve 4.

Figure 2:
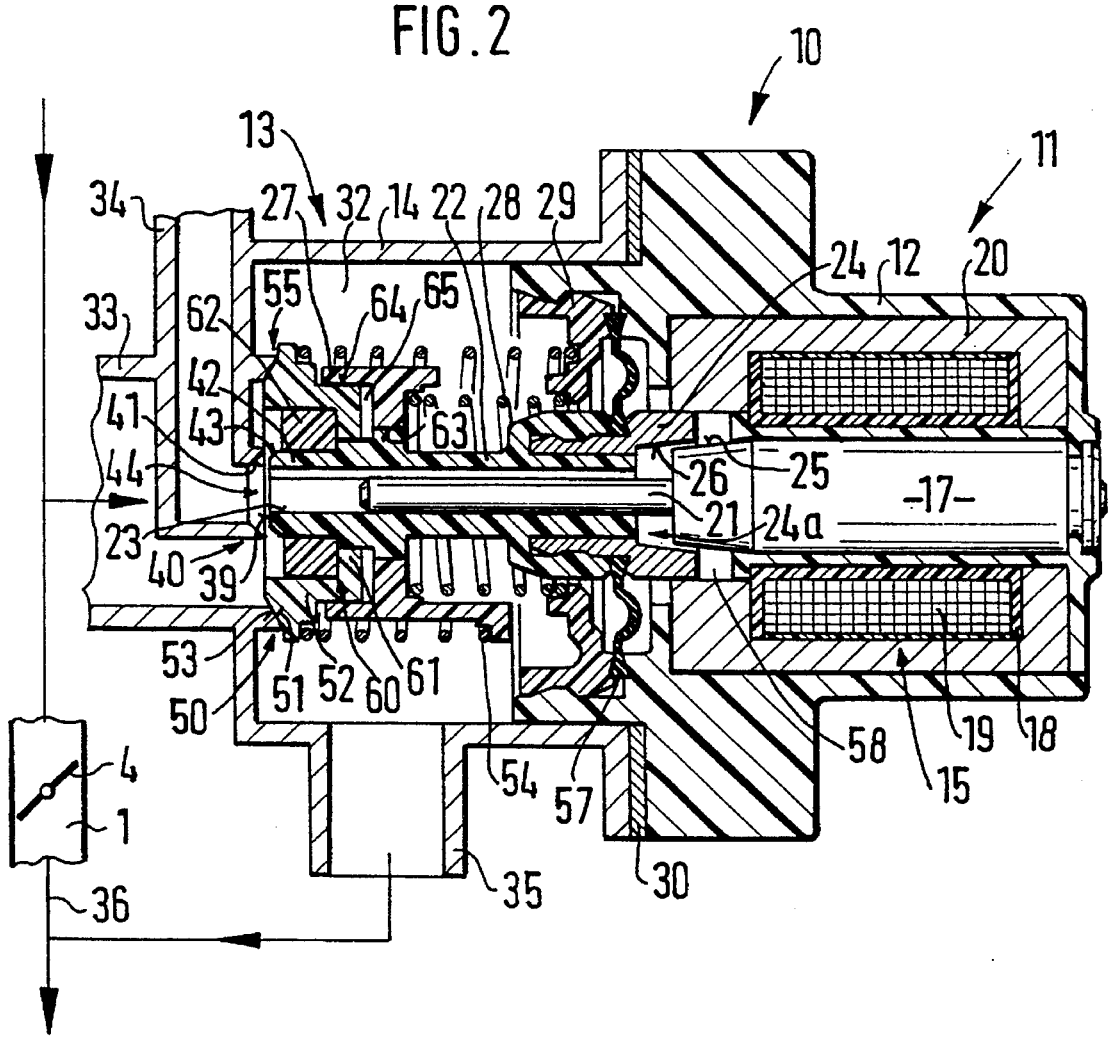
FIG. 2 is a longitudinal section through a first exemplary embodiment of an apparatus according to the invention.

The apparatus 10 shown in further detail in FIG. 2 is made up essentially of a drive element 11 with a drive housing 12 and an actuator element 13 with an actuator housing 14. The drive housing 12 is made of plastic, for instance, and includes an induction core 17, which is surrounded by a winding 19 on a coil body 18 and by a ferromagnetic annular body 20. The elements 17, 18, 19 and 20 may be fixed in the drive housing 12 by extrusion-coating with plastic, for instance, and form a control drive of the apparatus 10.

The winding 19 can be subjected to electrical voltage, so that between the elements 17, 19 and 20, a magnetic field can form in a known manner, whose intensity is equivalent to the state of excitation of the winding 19.

On the face end of the induction core 17 toward the actuator element 13, a bearing protrusion 21 extending in the axial direction is formed concentrically with the induction core 17. An adjusting member 22, for instance a plastic sliding sleeve, is supported on the bearing protrusion 21 so as to be axially displaceable without significant radial play; the bearing protrusion 21 is disposed at least partly in a continuous bearing opening 23 formed axially in the adjusting member 22. On its side toward the induction core 17, the adjusting member 22 is rigidly joined to an annular ferromagnetic armature 24, upon which a magnetic attraction force toward the drive element 11 acts upon excitation of the winding 19. The induction core 17 protrudes partway into a concentric annular opening 24a located in the armature 24 and has a conical jacketlike outer face 25, which corresponds with a conical jacketlike inner face 26 formed on the armature 24. The adjusting member 22 is surrounded by a stop body 27, which is firmly joined to the adjusting member 22 or is formed on the adjusting member 22 itself. The stop body 27 is engaged by a restoring spring 28, which on its other end is supported on a cap 29 that is firmly joined to the drive housing 12 and which acts upon the adjusting member 22 with a restoring force counter to the attraction force of the drive element 11, so that a more or less great overlap between the armature 24 and the induction core 17 is brought about, depending on the state of excitation of the winding 19.

The actuator housing 14 forms a cylindrical receiving opening 32, oriented toward the drive element 11, and the drive housing 12 can be inserted partway into this opening, which is thereby closed off from the outside. The drive housing 12 and the actuator housing 14 can be joined together by screwing or riveting means, for instance by means of a flange, or in some other suitable way. A spacer disk 30 may be disposed between the drive housing 12 and the actuator housing 14. With its wall, the actuator housing 14 also forms the operating fluid delivery line 33, which is for instance coaxial with the bearing protrusion 21, as well as the first flow line 34 for connecting the apparatus 10 to the fuel metering device 6 and the second flow line 35 for connecting the apparatus 10 to the region 36 of the intake conduit 1 downstream of the throttle valve 4. The lines 33, 34 and 35 may instead be embodied separately and may communicate with the actuator housing 14 in a known manner (for instance by means of plug-, screw- or snap-type connections). It is also conceivable for the actuator housing 14 to be formed by a wall of the intake conduit 1 or on that wall itself.

The first and second flow lines 34, 35 each point radially out of the actuator housing 14. The quantity of operating fluid that can be delivered to the fuel metering device 6 via the first flow line 34 is controllable via a first control valve 40. The first control valve 40 is disposed centrally in the operating fluid delivery line 33 in an axial extension of the adjusting member 22, on a face end 39 remote from the induction core 17. The wall of the first flow line 34 forms a first valve seat 41, which is in the form of a truncated cone, by way of example, and forms a first valve opening cross section 44, by way of which operating fluid from the operating fluid delivery line 33 can reach the first flow line 34. Beginning at the first valve seat 41, the first flow line 34 extends over a portion initially centrally in the operating fluid delivery line 33 counter to the flow direction in that line, and after that extends radially to outside the operating fluid delivery line 33 and actuator housing 14. The first control valve 40 has a first valve closing member 42, which is formed by the adjusting member 22. The face end 39 of the adjusting member 22 forms a first valve face 43, which is in the form of a truncated cone, corresponding to the first valve seat 41. As a result of the axial motion of the adjusting member 22, the first valve opening cross section 44 can close or open further, beginning at the valve position of the apparatus 10 as shown.

The quantity of operating fluid that can be delivered to the engine 3 via the second flow line 35 is controllable by a second control valve 50. Delivering operating fluid to the engine 3 via the second flow line 35 is necessary especially whenever the quantity of operating fluid that is deliverable via the first flow line 34 is inadequate by itself to maintain a desired rpm.

The second control valve 50 includes a second valve seat 51, which by way of example is in the form of a truncated cone, and a second valve closing member 52 with a second valve face 53 embodied to fit the second valve seat 51. The second valve closing member 52 is annular in embodiment and is penetrated by the adjusting member 22. A second compression spring 54 urges the second valve closing member 52 in the valve closing direction and for that purpose is supported at one end on the second valve closing member 52. On the other, the second compression spring 54 is supported either on the cap 29 (as shown in the upper half of FIG. 2) or on the stop member 27 (as shown in the lower half of FIG. 2). The second valve seat 51 forms a second valve opening cross section 55, by way of which operating fluid can reach the second flow line 35, if the second valve closing member 52 is lifted from the second valve seat 51.

The second valve closing member 52 is likewise adjustable by means of the adjusting member 22. To that end, the adjusting member 22 and the second valve closing member 52 are coupled via a slaving device 60. The slaving device 60 is formed by a protrusion 61, formed on the second valve closing member 52 and pointing inward, and a slaving ring 62 secured to the adjusting member 22, for instance being screwed to it or press-fitted onto it. The protrusion 61 is located closer to the drive element 11 in the axial direction and engages the slaving ring 62 from behind, so that upon an adjusting motion of the adjusting member 22 out of the position of the apparatus 10 shown in FIG. 2 toward the induction core 17, slaving of the second valve closing member 52 occurs because of the axial form-fitting engagement that results between the elements 61, 62. In this way, the second valve closing member 52 can be lifted from the second valve seat 51, and the second control valve 50 can thus be opened.

In the first exemplary embodiment shown in FIG. 2, the second valve closing member 52 is supported axially displaceably on the slaving ring 62 by its inside 63 that is surrounded by the protrusion 61. Axial support of the second valve closing member 52 may also be done via an outside 64 of the second valve closing member 52, in an opening 65, formed in the stop body 27, in which the second valve closing member 52 is displaceably disposed. To avoid leakage losses via the inside 63 and outside 64 of the second valve closing member 52, both supports should be made as play-free as possible.

FIG. 2 shows the apparatus 10 with the first control valve 40 open and the second control valve 50 closed. The winding 19 is partially excited. If the excitation of the winding 19 out of the position shown is reduced, then the adjusting member 22 is adjusted by the first compression spring 28 in the closing direction of the first control valve 40, until the first valve face 43 contacts the first valve seat 41. If there is adequate radial mobility of the adjusting member 22, the first valve closing member 42 centers itself on the first valve seat 41, so that very good sealing action is attainable. During the closing motion of the adjusting member 22, the second control valve 50 remains closed. The adjusting member 22 and hence the stop body 27 as well, along with the slaving ring 62, slide away axially relative to the second valve closing member 52. The stop body 27 and adjusting member 22 have an adequate axial spacing from the second valve closing member 52, for that purpose.

In the closed state of the apparatus 10, or in other words with the valve opening cross sections 44, 55 closed, the slaving ring 62 and the protrusion 61 are spaced axially apart. Upon an ensuing opening of the apparatus 10, this axial spacing defines the point beyond which the second valve closing member 52 is adjustable, or in other words opens, in relation to the first valve closing member 42 (or in other words, at which opening position of the valve closing member 42 this occurs).

If in the position of the apparatus 10 as shown the excitation of the winding 19 is increased further, the adjusting member 22 is attracted by the armature 23 toward the induction core 17. Via the slaving device 60, the second valve closing member 52 is then lifted from the second valve seat 51. If the second spring 54 is supported against the cap 29 (as shown at the top in FIG. 2), then the initial stressing force of the second compression spring 54 must additionally be overcome for that purpose. If the support of the second compression spring 54 is effected relative to the stop member 27 (as shown in FIG. 2 at the bottom), then for opening the second control valve 50, only the initial stress of the first compression spring 28 needs to be overcome, because in that case the second valve closing member 52 and the stop body 27 are not displaced relative to one another.

It should also be noted that the aforementioned embodiments, with respect to the disposition of the second compression spring 54 between the second valve closing member 52 and the stop body 27 shown in the lower half of the drawing, apply only if the initial stress of the second compression spring 54 is less than the initial stress of the first compression spring 28. Only then can a closing state of the apparatus 10 be attained with the winding 19 unexcited, because otherwise the second compression spring 54 urges the adjusting member 22 in the opening direction, when the second valve closing member 52 is closed, and opens the first control valve 40. This kind of spring disposition, given a suitable selection of the initial stresses of the springs, may nevertheless be quite desirable, for instance because then an emergency air function, which enables idling of the engine 3 in the event of malfunctions (actuator failure, icing of the control valves), is attainable. The actuator 15 must then be embodied to act bidirectionally, so that it can close the first valve closing member 42 counter to the force of the second compression spring 54.

A compensation chamber 58, defined by an elastic diaphragm 57, is provided in the interior of the drive element 11; via a compensation opening 59 (FIG. 3), for instance a compensation groove, disposed axially continuously in the adjusting member 22, this chamber communicates with a region of the operating fluid delivery line 33 upstream of the apparatus 10, and as a result the hydraulic pressure exerted on the apparatus 10 in the valve opening direction by operating fluid inside the operating fluid delivery line can be at least partially compensated for, in a known manner.

Figure 3:
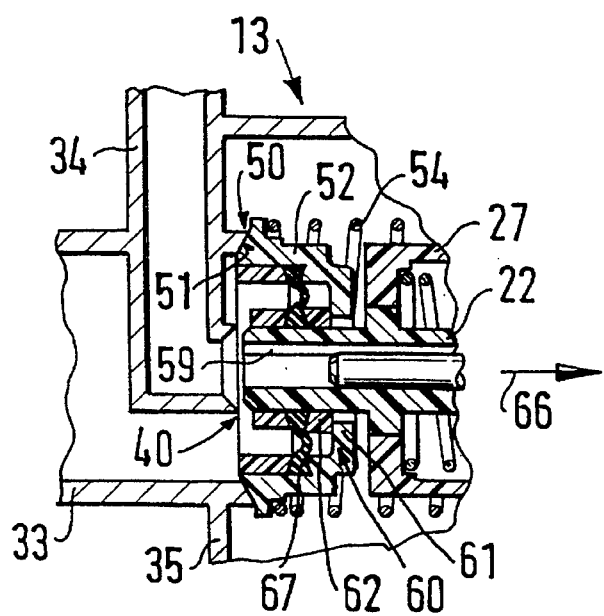
FIG. 3 is a fragmentary section of a second exemplary embodiment.

FIG. 3 shows a second exemplary embodiment of an apparatus according to the invention for governing the idling rpm of an internal combustion engine 3. Elements that are the same and function the same are identified by the same reference numerals as in FIG. 2. FIG. 3 shows a fragmentary section of the actuator element 13 of the apparatus 10. In contrast to the first exemplary embodiment of FIG. 2, the second valve closing member 52 here is penetrated with great radial play by the adjusting member 22. The second valve closing member 52 and the adjusting member 22 are likewise coupled via a slaving device 60, so that upon an adjustment of the adjusting member 22 in the direction of an arrow 66 the second control valve 50 can be opened, while upon an adjustment in the opposite direction, with the second control valve 50 closed, the first control valve 40 can be closed. The slaving device 60 is again formed by an inward-pointing protrusion 61 embodied on the second valve closing member 52 and by a slaving ring 62 secured to the adjusting member 22. However, the slaving ring 62 does not touch the second valve closing member 52.

To avoid leakage losses when the second control valve 50 is closed, an annular elastic diaphragm 67 is disposed between the second valve closing member 52 and the adjusting member 22. In that case, external guidance of the second valve closing member 52 inside the opening 65 (FIG. 2) of the stop body 27 can be dispensed with. The second valve closing member 52 is radially held by the second compression spring 54. If the second control valve 50 is closed, the second valve closing member 52 centers itself on the second valve seat 51 because of the radial mobility of the second compression spring 54, so that good sealing action of the second control valve 50 is attainable.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for governing an idling rpm of an internal combustion engine by controlling a quantity of operating fluid that is delivered to at least two flow lines of the engine, a first flow cross section of a first flow line is controllable by means of a first valve closing member, and a second flow cross section of a second flow line is controllable by means of a second valve closing member, and the first flow line communicates with a fuel metering device of the engine, and the second flow line communicates with an intake conduit of the engine downstream of a throttle device disposed in the intake conduit, the apparatus having an electromechanical actuator, disposed in a drive housing, and an adjusting member coupled to the actuator, by means of said adjusting member the first and second valve closing members are adjustable from a closing position to an opening position, the first valve closing member (42) and the second valve closing member (52) are axially displaceable relative to one another, and the first and second valve closing members (42, 52) are coupled via a slaving device (60) in such a way that in the closing position of the first valve closing member (42), the second valve closing member (52) is likewise closed, and the second valve closing member (52) is adjustable only after the attainment of a predetermined opening position of the first valve closing member (42) in the valve opening direction.

2. An apparatus as defined by claim 1, in which the first valve closing member (42) is disposed on an end of the adjusting member (22) remote from the actuator (11), and the second valve closing member (52), reaches through the adjusting member (22), and is axially displaceably supported on the adjusting member (22) or on a slaving ring (62) joined to the adjusting member (22) and/or on a stop body (27).

3. An apparatus as defined by claim 1, in which the adjusting member (22) protrudes with radial play through the second valve closing member (52), and that an elastic diaphragm (67) is disposed between the adjusting member (22) or slaving ring (62) and the second valve closing member (52).

4. An apparatus as defined by claim 1, in which the slaving device (60) is formed by a radially outwardly protruding slaving ring (62) joined to the adjusting member (22) and by a protrusion (61) that points inward, the slaving device is joined to the second valve closing member (52) and engages the slaving ring (62) from behind, wherein in the closing position of the first valve closing member (42), the slaving ring (62) and protrusion (61) have a predetermined axial spacing from one another.

5. An apparatus as defined by claim 1, in which the second valve closing member (52) is urged in the valve closing direction by the force of a second spring (54).

6. An apparatus as defined by claim 5, in which the second spring (54) is supported between the second valve closing member (52) and the adjusting member (22).

7. An apparatus as defined by claim 6, in which the second spring (54) has a greater initial stressing force than a first spring (28) that acts upon the adjusting member (22), and the actuator is bidirectionally active.

8. An apparatus as defined by claim 1, in which the adjusting member (22) is supported axially displaceably on a bearing protrusion (21) joined to the actuator (11).

* * * * *